May 19, 1959  LA VERNE O. ELLINGSON  2,887,237
AUTOMOBILE BOAT LOADING AND CARRYING ATTACHMENT
Original Filed Feb. 19, 1954  3 Sheets-Sheet 1
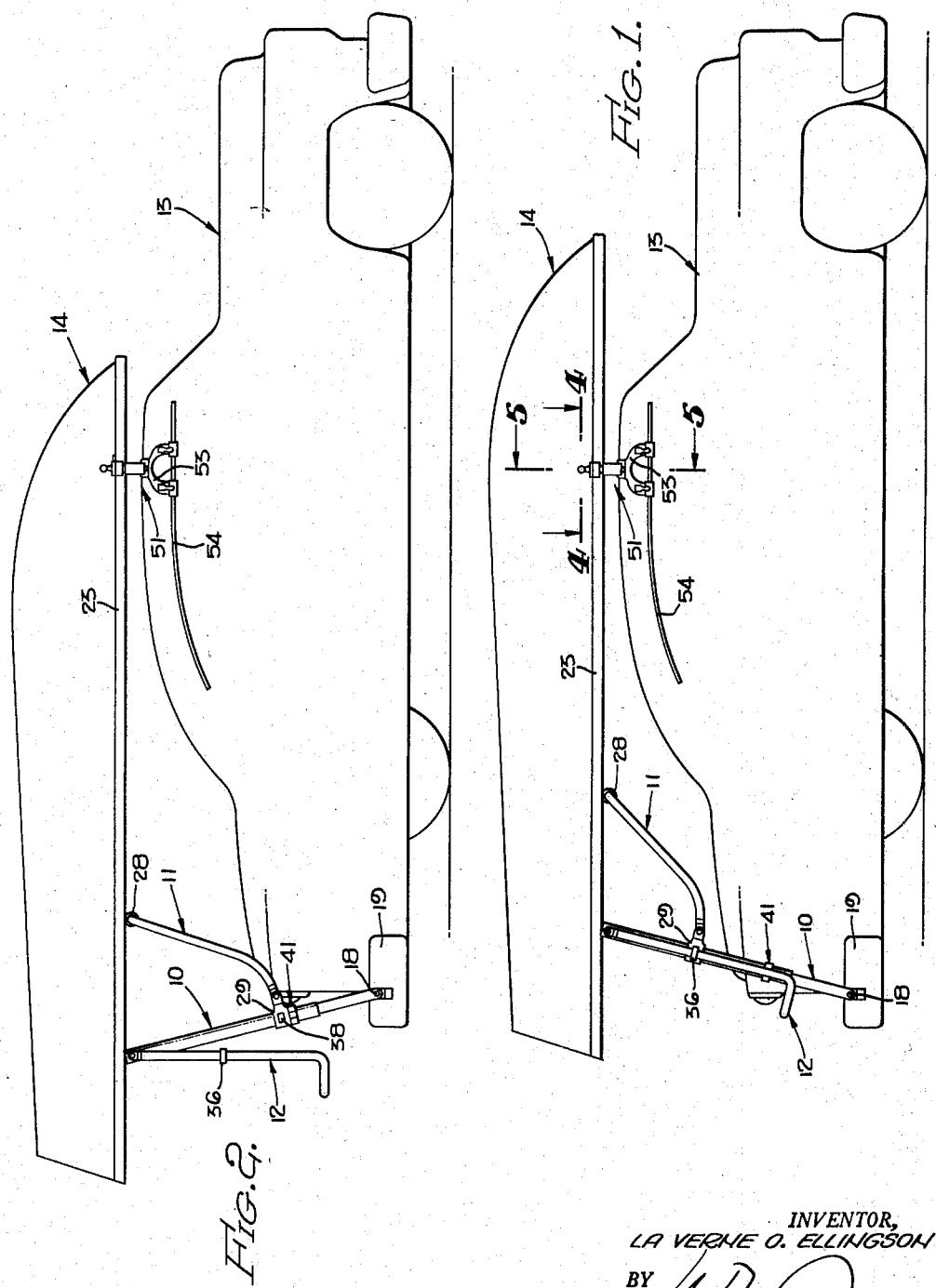
INVENTOR,
LA VERNE O. ELLINGSON
BY
ATTORNEY May 19, 1959   LA VERNE O. ELLINGSON   2,887,237
AUTOMOBILE BOAT LOADING AND CARRYING ATTACHMENT
Original Filed Feb. 19, 1954   3 Sheets-Sheet 2
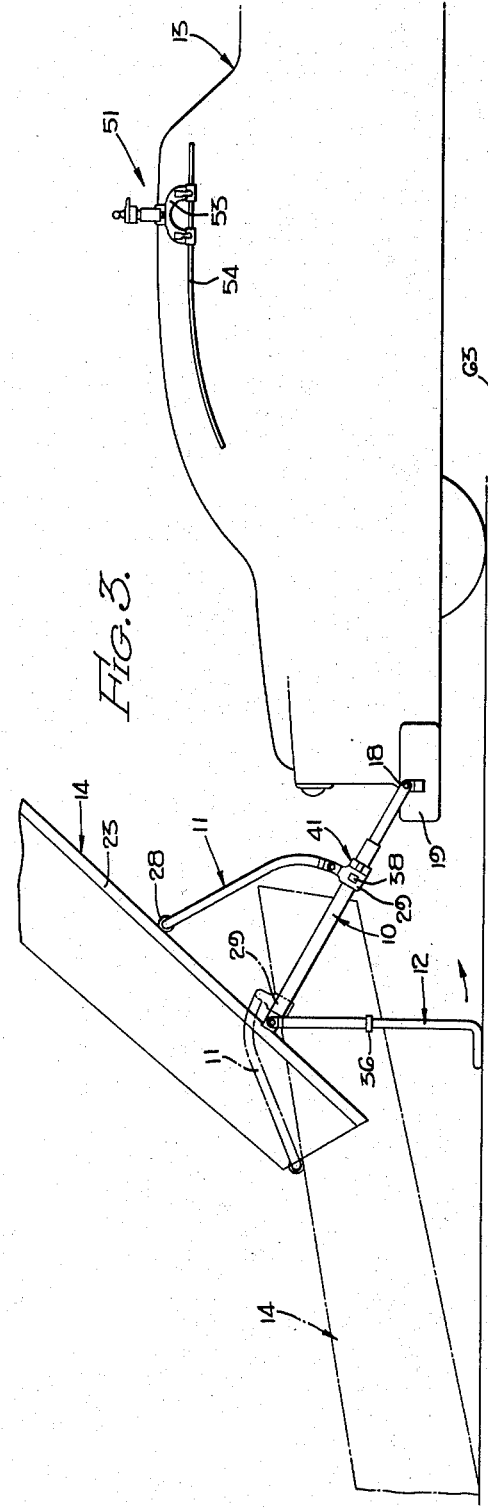
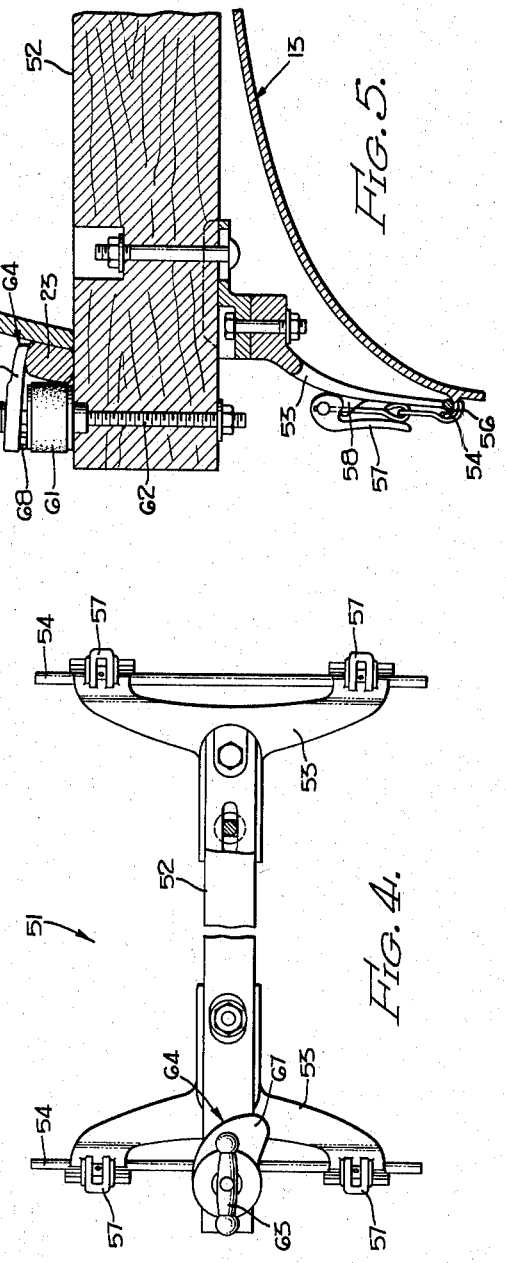
INVENTOR,
LA VERNE O. ELLINGSON
BY
ATTORNEY May 19, 1959     LA VERNE O. ELLINGSON     2,887,237
AUTOMOBILE BOAT LOADING AND CARRYING ATTACHMENT
Original Filed Feb. 19, 1954     3 Sheets-Sheet 3
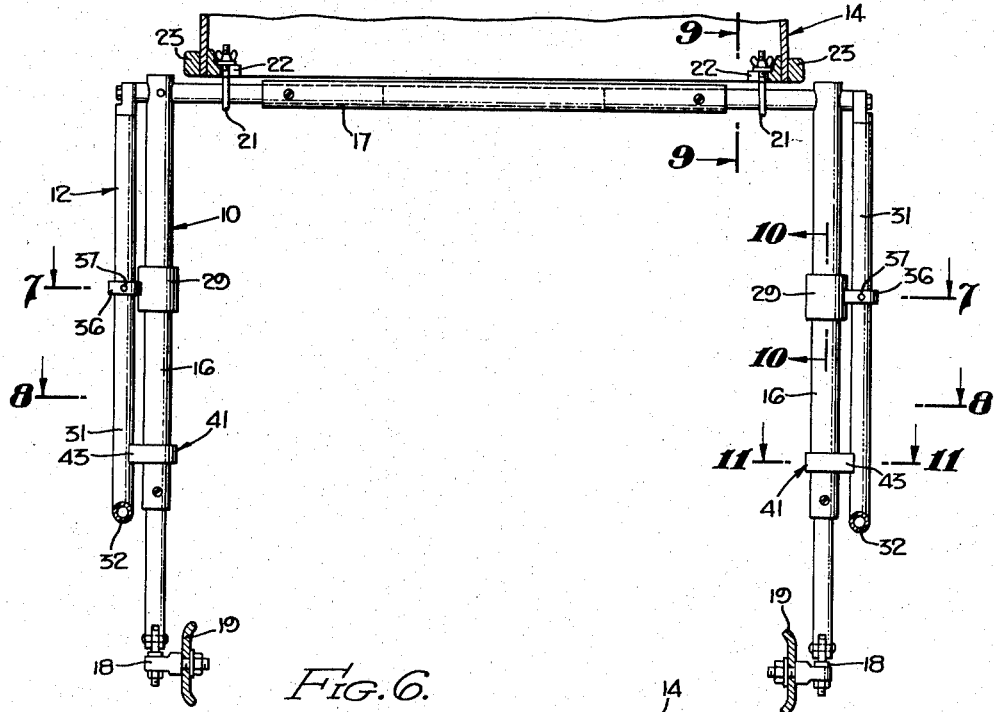
FIG. 6.
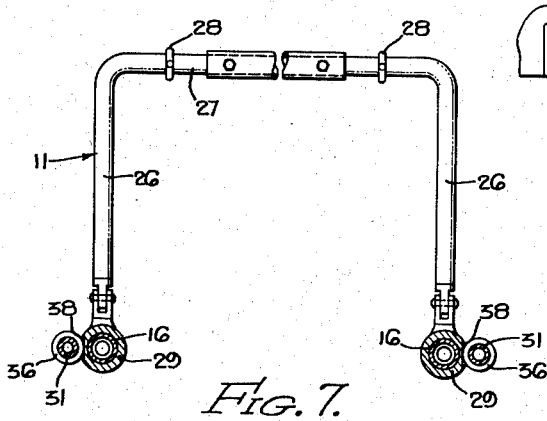
FIG. 7.
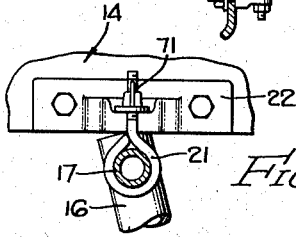
FIG. 9.
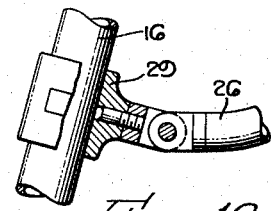
FIG. 10.
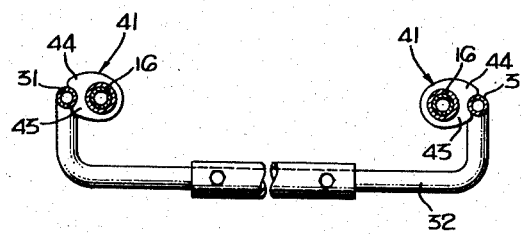
FIG. 8.
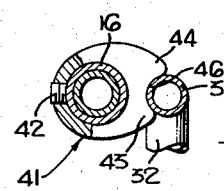
FIG. 11.
INVENTOR,
LA VERNE O. ELLINGSON
BY
ATTORNEY

United States Patent Office 2,887,237
Patented May 19, 1959

2,887,237
AUTOMOBILE BOAT LOADING AND CARRYING ATTACHMENT

La Verne O. Ellingson, Monrovia, Calif., assignor to Quik-N-Easy Products, Ltd., Monrovia, Calif., a corporation of California Continuation of application Serial No. 411,505, February 19, 1954. This application June 20, 1957, Serial No. 667,314

20 Claims. (Cl. 214—450)

This invention relates to an automobile boat loading and carrying attachment, and constitutes a continuation of my co-pending application Serial Number 411,505, filed February 19, 1954, now abandoned, which application is a continuation-in-part of application Serial Number 29,277, filed May 26, 1948, for an Automobile Boat Loading and Carrying Attachment, now United States Patent No. 2,670,113 issued February 23, 1954.

The present invention is directed to certain improvements in small boat loading and carrying devices adapted for expeditious attachment to passenger vehicles and by which such boats can be easily loaded and unloaded by one person relative to the roof of such vehicles. Devices of this general type have been in demand for many years and a variety of designs have been proposed. However, these are subject to certain disadvantages all of which are obviated by the construction constituting the present invention and representing improvements over the very satisfactory loader shown in my prior Patent 2,670,113. In that patent the principal vertical frame or strut members are slotted to accommodate a sliding shuttle member to which one end of a diagonal stabilizing brace member is pivotably anchored. Although this arrangement has proven very reliable and satisfactory, the long slot in the frame member weakens the frame members requiring the use of heavier stock for the frame members than would otherwise be necessary. In the present design both the slot and internal shuttle are eliminated and in their place the diagonal braces are pivotably connected to a pair of external sleeves slidable longitudinally along the outer surface of the unslotted tubular frame members. The travel of each sleeve in one direction is limited by abutment with a positive stop adjustable to any desired position along the lower end of the frame members. This positive stop eliminates the bouncing of the boat during its transition to and from the car likely to occur in the careless or inexperienced use of the resilient stop disclosed in the aforementioned prior patent. Furthermore, the adjustability of the stop to any point along the tubular frame provides a very simple means of easily and quickly adapting the loader to cars of widely differing dimensions as regards bumper heights and roof heights as well as respects the size of the boat. Of particular importance is the fact that the stop can be adjusted to a desired intermediate boat rest position forwardly beyond an upright boat position wherein the boat occupies a safe and stable position in readiness before elevation of the boat as a whole from the ground onto the roof of the vehicle.

Still another highly important feature is the use of a single member for locking the loader and the boat in a carrying position on a car and cooperating with forward clamp means for holding the boat securely anchored in a generally horizontal position on the top of the car. Additionally, the pivoting element of the locking device serves as a strut for supporting the bow end of the boat and the top end of the tubular frame spaced above the ground at the rear of the car during certain phases of the loading and unloading operation.

Accordingly, it is the primary object of the present invention to provide an improved boat loader adapted for attachment to conventional passenger vehicles and by means of which a small boat may be loaded and unloaded with ease by one person.

Another object of the invention is the provision of a boat loader featuring a main frame readily attachable to the rear half of the boat side walls and operable to over-end the boat onto the roof of a car and incorporating a new and improved stabilizing brace means engageable with a fixed stop thereby locking the boat against further forward pivoting during the final phase of the loading operation and the corresponding arc of the unloading operation.

Another object of the invention is the provision of a small boat loading mechanism employing relatively movable frame and brace members cooperable with one another to facilitate the loading and unloading of a small boat from a passenger vehicle and including simple but positive locking means for holding the frame and brace members against relative movement when the boat is in fully loaded position.

Another object of the invention is the provision of means for increasing the rigidity of the components of a boat loading device and for locking the same in a desired position when in boat carrying position.

Another object of the invention is the provision of a boat loader having improved means for detachably clamping the same to a part of a passenger vehicle as for example, the rain gutter along either side of the car roof.

Another object of the invention is the provision of a boat loader for a passenger vehicle comprising relatively pivoting and sliding tubular members featuring rigid stop means limiting relative pivoting and sliding during certain phases of its operation.

These and other objects and advantages of the invention will be more fully set forth in the following specification and claims considered in connection with the attached drawings to which they relate.

In the drawings:

Figure 1 is a side elevational view showing the attachment as supporting a boat in fully loaded and locked position on the top of an automobile;

Figure 2 illustrates the position of the components shown in Figure 1 after unlocking and after shifting thereof rearwardly as the first step in the boat unloading operation;

Figure 3 corresponds generally to Figures 1 and 2 and shows in solid lines the third step in the boat unloading operation, and in dashed lines the fourth step in the operation;

Figure 4 is a top plan view of the bow-supporting bracket, taken generally from station 4—4 shown in Figure 1;

Figure 5 is a detail section on line 5—5 of Figure 1;

Figure 6 is an end view, partly in section, looking forwardly from the rear of the automobile and showing the elements in their Figure 1 positions;

Figure 7 is a horizontal sectional view taken along line 7—7 of Figure 6;

Figure 8 is a horizontal sectional view on line 8—8 of Figure 6;

Figure 9 is a transverse detail sectional view taken along line 9—9 of Figure 6;

Figure 10 is a detail view, partly in section, on line 10—10 of Figure 6; and

Figure 11 is a detail sectional view taken along line 11—11 of Figure 6.

Referring to the drawings, and particularly to Figures 1–3 thereof, the boat loading and carrying attachment is seen to comprise generally a main frame 10, a diagonal stabilizer brace frame 11, and a prop frame 12, all of the frames being formed of lightweight and resilient material such as tubular aluminum. It is a feature of the loader that the various arm components of the frames 10—12 are adapted to be extended or contracted to adapt the loader for use with various types of motor vehicles, one of which is shown at 13, and various types of boats one of which is shown at 14.

The main frame 10 is generally U-shaped and comprises a pair of spaced parallel side arms 16 and a cross arm 17, the latter being connected between the upper end of arms 16 as best shown in Figure 6. The lower ends of arms 16 are pivotally and swively connected, by means of connectors 18, to the opposite end portions of the rear bumper 19 of automobile 13. As shown in Figure 6, the cross arm 17 of main frame 10 is adapted to be pivotally connected to the stern portion of boat 14 by means of screw eyes 21 mounted in brackets 22, the brackets being secured to the gunwales 23 of the boat as illustrated in Figure 9.

The brace frame 11 is also generally U-shaped, as shown in Figure 7, and comprises spaced parallel side arms 26 and a cross arm 27, the latter being pivoted or journaled in screw eyes 28 slidable along arm 27 to accommodate boats of different widths and secured to brackets, not shown, on the gunwales 23 of boat 14. The screw eyes 28 are adapted to be clamped to the gunwales rearwardly of the mid or central portion of the boat and a substantial distance forwardly from the screw eyes 21 for main frame 10. At their ends remote from cross arm 27 and screw eyes 28, side arms 26 are pivotally and swively connected (Figure 10) to sliding collars or sleeves 29 mounted on main frame arms 16 for sliding movement relative thereto. The construction and positioning of the diagonal stabilizer frame 11 is such that the boat 14 may be pivoted about cross arm 17 of main frame 10 and between the positions shown in solid and dashed lines in Figure 3. Furthermore, the sliding collars 29 are in generally intermediate positions on main frame arms 16 when the boat is in the fully loaded position illustrated in Figure 1.

The prop frame 12, also U-shaped, comprises spaced parallel side arms 31 connected at their lower ends by a cross arm 32, the latter being illustrated as curved outwardly to prevent its contact with the rear fender and trunk portions of automobile 13. The upper ends of side arms 31 are pivotally connected to the cross arm 17 of main frame 10. It is emphasized that the side arms 31 extend generally parallel to the corresponding arms 16 of main frame 10 and are disposed laterally thereof, preferably outwardly thereof as shown in Figure 6. In a preferred form the side arms 16 and 31 of the main and prop frames lie, when the boat is in the fully loaded position shown in Figure 1, in a common plane which is generally perpendicular to the longitudinal axis of automobile 13. The respective side arms of the main and prop frames are also disposed closely adjacent each other so that they may cooperate in interlocking relationship as will be described in detail subsequently.

According to the present invention, lock means are provided for preventing pivotal movement of the boat relative to main frame 10 by associating prop frame 12 and sliding elements 29 in such a way that the latter may not move along arms 16 of the main frame when the boat is in its fully loaded position. Furthermore, detent means are provided on arms 16 to hold the prop frame in a position such that the above-mentioned lock means are operative.

More specifically, the lock means comprise lock collars 36 adjustably mounted on arms 31 of prop frame 12, for example by means of set screws 37 shown in Figure 6. The lock collars 36, which are disposed to be adjacent sliding collars 29 when the boat is in fully loaded position, extend into generally horizontal grooves 38 formed in the outer portions of collars 29 as best illustrated in Figure 7. It will be evident that when the boat has been shifted to the fully loaded position shown in Figure 1, and the prop frame 12 pivoted so that its arms 31 are parallel and adjacent the arms 16 of main frame 10, the lock collars 36 will be inserted in grooves 38 and will serve to prevent any shifting of collars 29 along arms 16.

To hold the prop frame in position with its arms 31 parallel and adjacent the main frame arms 16, above-mentioned detent means are provided and comprise stops 41 adjustably mounted on main frame arms 16 and on the opposite sides of sliding collars 29 from cross arm 17, stops 41 being spaced a substantial distance from collars 29 when the boat is in fully loaded position. Referring specifically to Figure 11, each stop 41 is held in a desired adjusted position by a set screw 42 and comprises a pair of ears or protrusions 43 and 44 which define a recess or groove 46 having generally the same diameter as the external diameter of arm 31. One of the ears, numbered 43, is disposed to the rear of the loader and is relatively shorter or smaller than the other ear 44, so that the arm 31 may be pushed or snapped over it but not over the ear 44.

With the described construction, the drop frame 12 is snapped into locked position by pivoting it forwardly until the arms 31 flex slightly and resiliently snap over ears 43, the lock collars 36 then sliding into grooves 38 in the remote sides of sliding collars 29 to lock the latter as previously described. To reverse the operation and effect unlocking of the loader, the arms 31 are grasped relatively adjacent detents 41 and are snapped over ears 43 as the prop frame 12 pivots rearwardly. It is pointed out that, due to the natural resilience of the tubular aluminum prop frame, it may not be unlocked by pulling on the central portion of cross arm 32 since this pulling action merely operates to tighten the locking of the side arms 31 by ears 43.

The detents 41 not only serve the above described function but also serve as adjustable stops for the sliding collars 29. Referring to Figures 1 and 2, it is pointed out that after unlocking of the loader by pivoting prop frame 12 outwardly the boat 14 is shifted rearwardly from the Figure 1 position to the Figure 2 position. During this rearward shifting operation the sliding collars 29 shift downwardly on main frame arms 16 until they engage stops 41 whereupon the boat and frame members pivot as a rigid unit about the axis provided by bolts 18, collars 29 remaining in engagement with stops until the components reach the full line position shown in Figure 3. Thereafter the boat is pivoted about cross arm 17 of the main frame and to the dashed line position as sleeves 29 slide away from stops 41 and along frame members 16.

Referring specifically to Figures 4 and 5, it is pointed out that the front part or bow of boat 14 rests on a bow support bracket 51 disposed at the forward portion of the roof of automobile 13. Brackets 51 comprises a rigid cross bar 52, preferably formed of wood, and which is bolted at each end to supporting yokes 53. The arms of each yoke 53 extend downwardly from the cross bar 52 and seat in the adjacent rain trough 54 along the opposite sides of automobile 13. To hold the ends of the arms of each yoke 53 in the rain trough 54, cam latch elements are provided and each comprises a hook 56 seated under the rain trough, as shown in Figure 5, and pivotally linked to a cam finger 57. The cam finger 57 cooperates with a cam portion 58 formed on the corresponding yoke arm, these elements being so shaped that when the finger 57 is pivoted downwardly (Figure 5) the hook 56 will draw tightly against the under surface of the rain trough and the yoke arm will be held in seated position. To release each yoke arm end from the rain trough, and thus permit dismounting of bow support bracket 51, the cam finger 57 is pivoted upwardly so that the hook 56 drops away from the rain trough.

Bow support bracket 51 additionally comprises, at each of its ends, a stop and clamp member comprising a rubber buffer or stop 61 (Figure 5) which is secured by a bolt 62 to the upper end portion of cross bar 52. Bolt 62 extends through stop 61 and has threaded on its upper portion a hand nut 63 adapted to force downwardly a clamping element 64 which seats over the gunwale 23 of boat 14 as illustrated. The construction of clamping element 64 is of great importance, it comprising a cam portion 67 seating over a gunwale 23, and an adjustable raised portion 68 preferably in the form of a bolt threaded upwardly into clamping element 64 on the opposite side of bolt 62 from cam portion 67. Cam portion 67 is so shaped that it will bear tightly against boat 14 and the gunwale 23 to hold the boat firmly in position, any tendency of the boat to shift rearwardly serving to enhance the clamping effect of cam portion 67. Raised portion or bolt 68 seats on a metal washer above rubber stop 61 and serves as the fulcrum for a pivoting action created upon downward twisting of hand nut 63 to force cam portion 67 in close engagement with the gunwale surface. It is a feature of the invention that the stops 61 are spaced from each other a distance such that both will be engaged by the gunwales 23 of boat 14 when the boat is in its extreme forward position.

In the operation of the automobile boat loading and carrying attachment let it be assumed that the boat is in the fully loaded position shown in Figure 1, with the bow support bracket 51 in clamping relation and with the prop frame 12 in locked relation over the main frame 10 as illustrated. It is then impossible for the boat 14 to shift rearwardly, while remaining horizontal, since any rearward boat movement would effect pivoting of the boat relative to the main and brace frames in a direction to decrease the angle between gunwales 23 and main frame 10, an action requiring sleeves 29 to slide downwardly along tubes 16. This downward sliding of the collars is impossible due to their locking association with lock collars 36. Accordingly, pivoting of the boat relative to the main and brace frames is positively prevented. Because of the truss relationship thus created, the boat may only move rearwardly upon pivoting of the main and brace frames as a unit about pivot members 18 to effect lifting of the boat off support bracket 51. This is prevented not only by the support bracket clamps but also by the weight of the boat when substantially forward of the pivot axis through connectors 18.

Collars 36 are held in locked relationship in the grooves 38 of sliding collars 29 by stops 41 over which the side arms 31 of the prop frame are snapped. Not only are the parts held in the desired supporting positions by the locking action of collars 36 and detents 41, but the supporting relationship is an extremely rigid one due to the fact that the prop frame 12 operates to support and strengthen main frame 10. It has, in fact, been found that any attempt to shift the boat 14, for example laterally, does not effect any shifting but instead merely effects rocking of the automobile 13 on its springs. Should the boat 14 tend to shift rearwardly, the cam portions 67 of bow support bracket 51 would pivot to a position at which their clamping action is increased, this occurring due to the fact that each cam portion projects forwardly as illustrated in Figure 4.

To effect unloading of the boat 14 from automobile 13, the hand nuts 63 are loosened to unclamp the bow portion of the boat, and side arms 31 of prop frame 12 are grasped and snapped over the ears 43 of detents 41. Prop frame 12 is then grasped and pulled rearwardly to effect rearward sliding of the boat on cross bar 52, the collars 29 then shifting downwardly on main frame 10 as the main and brace frames pivot about their axes. Excessive rearward shifting is effectively prevented upon the movement of sleeves 29 into engagement with stops 41 normally occurring as the boat is pulled rearwardly to the Figure 2 position. As the next step in the unloading operation, the stern portion of boat 14, or the prop frame 12, is grasped and pulled rearwardly to effect pivoting of main frame 10 about connectors 18, the prop frame 12 then hanging free and serving to prevent, upon engagement with the underlying ground surface, excessive pivotal movement of the main frame. It is pointed out that the described pivoting of the main frame is relatively easy to accomplish since the boat has previously been shifted rearwardly to a position at which it tends to fall or pivot by its own weight. Thereafter, the boat 14 is grasped and pivoted about cross bar 17 of main frame 10 until its bow engages the ground as illustrated in dashed lines in Figure 3, with the prop frame 12 serving to prevent interference between the stern of the boat and the underlying surface. During this latter pivotal operation, stabilizer brace frame 11 pivots about screw eyes 28 in such a way that sliding collars 29 are shifted upwardly and rearwardly and away from detents 41.

It is important to note that while the boat is being pivoted either forwardly or rearwardly between the positions shown in Figures 2 and 3, sleeves 29 remain pressed firmly against adjustable stops 41. By reason of this fact and of the boat weight, members 10 and 11 are rigidly fixed and the entire assembly pivots as a unit about connector 18. Accordingly, the operator need only be concerned with applying the force required to pivot the unit. Since the center of gravity of the unit is rearward of the connectors 18, the unit is stable while resting on prop 12 in the position shown in Figure 3. This is of considerable importance and permits the boat to be loaded and unloaded in definite stages, in each of which the boat may be left with safety while the operator makes any necessary checks or adjustments.

After being lowered to the deshed line position of Figure 3, boat 14 is disengaged from the boat loading attachment by removing the wing nuts 71 (Figure 9) which secure the various screw eyes in their brackets. After the boat has been used it is returned to the car and the operation described above is carried out in reverse order, it being noted that as the boat is pivoted clockwise as shown in Figure 3 from the dashed to the solid line position excessive rotational movement is prevented upon engagement of sliding collars 29 with detents 41.

It is to be further noted that as the boat is shifted from the Figure 2 to the Figure 1 position it comes to rest automatically upon engagement of gunwales 23 with stops 61, the latter also operating to center the boat as it is shifted forwardly. Hand nuts 63 are then tightened to clamp the bow of the boat, and prop frame 12 is snapped over detents 41 to effect the locking action previously described.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. Apparatus for loading a boat onto the top of a motor vehicle and for maintaining the boat in loaded position thereon, which comprises a main frame pivotally connected between said boat and said vehicle, a prop frame associated with said main frame and adapted to maintain one portion of said boat in spaced relation above the ground during the unloading of said boat from said vehicle, and interlocking means associated with said prop frame and with said main frame cooperable to prevent pivotal movement of said boat relative to said main frame when said boat is in loaded position on said vehicle.

2. Apparatus for loading a boat onto the top of an automobile and for maintaining the boat in loaded position thereon, which comprises a main frame pivotally connected to one end portion of said boat and to the lower rear portion of said automobile, a brace frame pivotally connected at one end to said boat in spaced relation from said main frame, said brace frame being slidably and pivotally connected at its other end to said main frame, and means to prevent sliding of said other end of the brace frame relative to said main frame when said boat is in fully loaded position on said automobile.

3. The invention as claimed in claim 2, in which the last named means comprises a prop frame pivotally connected to said main frame and adapted to interlock with said other brace frame end when in one pivoted position, and to support said one end portion of said boat when in a second pivoted position permitting sliding of said other brace frame end.

4. The invention as claimed in claim 3, wherein said other brace frame end is formed with a transverse groove, and a protuberance is provided on said prop frame and adapted to slide into said groove upon pivoting of said prop frame to said one pivoted position.

5. The invention as claimed in claim 3, wherein means are provided on said main frame to hold said prop frame in said one pivoted position.

6. An apparatus for loading a boat onto an automobile and for holding the same in loaded position thereon, which comprises a bow support bracket mounted on the roof of said automobile, a main frame pivotally connected to the rear bumper of said automobile and to the stern portion of said boat, sliding means mounted on said main frame for sliding movement longitudinally thereof, a brace frame pivotally connected to said sliding means and to said boat substantially forwardly of the pivotal connection for said main frame, a prop frame pivotally connected to said main frame adjacent said boat and adapted to support said stern portion of said boat during the unloading operation, lock means on said prop frame to interlock with said sliding means and prevent movement thereof along said main frame when said boat is in fully loaded position, and detent means on said main frame to hold said prop frame in a position effecting locking of said sliding means by said lock means.

7. The invention as claimed in claim 6, in which said main and prop frames have arm portions adapted to lie parallel and adjacent each other and in a common plane generally transverse to the longitudinal axis of said automobile when said boat is in fully loaded position, in which said lock means comprises collars adapted to be inserted into grooves in said sliding means when said boat is in said fully loaded position, and in which said detent means are additionally adapted to serve as adjustable stops for said sliding means, said prop frame being adapted to resiliently snap over said detent means and effect both holding of said collars in locking position in said grooves and bracing of said main frame for more rigid holding of said boat in fully loaded position.

8. An apparatus for loading a boat onto an automobile and for holding the same in loaded position thereon, which comprises a support bracket for one end of a boat mounted on the roof of said automobile, a main frame pivotally connected to the rear bumper of said automobile and to the other end of said boat, sliding means mounted on said main frame for sliding movement longitudinally thereof, a brace frame pivotally connected to said sliding means and to said boat substantially forwardly of the pivotal connection for said main frame, a prop frame pivotally connected to said main frame adjacent said boat and adapted to support said other end of said boat during the unloading operation, lock means on said prop frame to interlock with said sliding means and prevent movement thereof along said main frame when said boat is in fully loaded position, and detent means on said main frame to hold said prop frame in a position effecting locking of said sliding means by said lock means.

9. Apparatus for loading and carrying a boat on the roof of a motor vehicle comprising a main frame adapted for pivotal connection to the rear end of a vehicle frame and adapted to support the rear end of a boat on the vehicle, diagonal brace means adapted to be secured at one end to the rear midsection of a boat and having its other end slidable longitudinally of said main frame by means including a sleeve surrounding said main frame, and adjustable rigid stop means limiting the sliding of said sleeve along said main frame while the boat and said loading apparatus are being pivoted between a position on the vehicle roof and an intermediate rest position between loaded and unloaded positions with the boat upended and tilted slightly forwardly of its vertical position.

10. Apparatus for loading and carrying a boat on the roof of a motor vehicle, said apparatus comprising a transverse crosspiece having toggle clamp means adapted for detachable anchorage to the rain gutter along the opposite forward sides of a car top, a loading device adapted to have its lower end pivotally clamped to the lower end of a vehicle, means for clamping the other end of the device pivotally to the gunwales of a boat near one end thereof, diagonal stabilizer brace means adapted to be pivotally connected at one end to a midsection of the boat and having its other end pivotally and slidably connected to said loading device, rigid means adjustable along said loading device for limiting sliding movement of said stabilizer while the boat is positioned between a carrying position on the vehicle roof and an intermediate rest position pivoted upwardly away from said car roof, and means for clamping the boat to said crosspiece.

11. Apparatus as defined in claim 10 wherein said toggle clamp means comprises a rigid strut member adapted to seat in the rain gutter and having an adjustable clamping member conforming to the rounded lower surface of rain gutter, and manually operable toggle means connected between said strut and said clamping means for moving said clamping means into and out of gutter clamping position.

12. Apparatus as defined in claim 11 wherein said crosspiece includes at its opposite end portions manually adjustable means for detachable clamping engagement over the gunwales of a boat resting bottomside up on said crosspiece.

13. Apparatus for over-turning a boat lengthwise thereof as an incident to loading and unloading the same onto and from a car roof, said apparatus comprising an inverted rigid U-frame adapted to have its lower ends pivoted to one end of a car frame, means for clamping the bight portion of said U-frame to the gunwales of a boat near one end, a second U-frame adapted to be pivotally connected to the boat near the mid-length thereof, sleeve means slidable along the exterior leg portions of said inverted frame and pivotally connected to the leg ends of said second U-frame, means for rigidly clamping the forward end of an over-turned boat to one end of a car roof on which the boat is resting, and means for rigidly locking said sleeves against sliding movement along the legs of said inverted U-frame.

14. Apparatus as defined in claim 13 wherein said U-frames are formed from lightweight metal tubing.

15. Apparatus as defined in claim 14 including rigid stop means adjustable lengthwise of the legs of said inverted U-frame and positioned to limit the sliding of said sleeves downwardly along said legs while said boat is being pivoted between the car roof and an intermediate rest position wherein the boat is positioned forwardly of an upright position in a direction toward the car roof.

16. Apparatus for over-turning a boat lengthwise thereof as an incident to loading and unloading the same onto and from a car roof, said apparatus comprising an inverted rigid U-frame adapted to have its lower ends pivoted to one end of a car frame, means for clamping the bight portion of said U-frame to the gunwales of a boat near one end, a second U-frame adapted to be pivotally connected to the boat near the mid-length thereof, sleeve means slidable along the exterior leg portions of said inverted frame and pivotally connected to the leg ends of said second U-frame, adjustable non-resilient stop means on the lower ends of said second U-frame legs positioned to prevent relative pivotal movement between a boat and both of said U-frames while the boat is moving through an arc of less than 90° terminating with said boat resting on a car roof and operable to permit unrestricted pivotable movement between each of said U-frames and a boat while the boat is moving through an arc substantially greater than 90° and terminating at the angle at which said sleeves contact said stop means.

17. A boat support bracket for releasably clamping an over-turned boat on the roof of a car, said bracket including a crosspiece adapted to extend across the car roof for support above and out of contact therewith, a pair of unitary rigid supporting struts secured to the opposite ends of said crosspiece having ends adapted to seat in and to support said crosspiece directly by the rain gutter of a car roof, lever-controlled cam operated clamping means mounted on said struts and engageable with the bottom of the rain gutter to lock said struts rigidly in the gutter, and means carried by said crosspiece for releasably clamping the gunwales of a boat thereto.

18. A boat support bracket as defined in claim 17 wherein said crosspiece supporting struts are of inverted Y-shape with the ends of the Y mouth spaced to either side of the crosspiece and adapted to seat in a car roof rain gutter.

19. A boat support bracket as defined in claim 18 wherein said gunwale clamping means includes a thick-walled ring of resilient material positioned to lie closely adjacent one side wall of a boat gunwale.

20. A boat support bracket as defined in claim 18 wherein said gunwale clamping means includes a pair of movable fingers carried on the upper surface of said crosspiece each having an end engageable over a portion of the boat gunwales, and manually adjustable means for clamping said fingers over the gunwales to lock the boat to said crosspiece.

References Cited in the file of this patent
UNITED STATES PATENTS

| | | |
|---|---|---|
| 2,434,387 | Brandt | Jan. 13, 1948 |
| 2,486,316 | Morse et al. | Oct. 25, 1949 |
| 2,561,199 | Harder | July 17, 1951 |
| 2,613,020 | Berry | Oct. 7, 1952 |
| 2,784,888 | Lecance-Deschamps | Mar. 2, 1957 |